United States Patent
Ishiou

(10) Patent No.: US 8,352,789 B2
(45) Date of Patent: Jan. 8, 2013

(54) OPERATION MANAGEMENT APPARATUS AND METHOD THEREOF

(75) Inventor: Ken Ishiou, Tokyo (JP)

(73) Assignee: NEC Corporation, Tokyo (JP)

( * ) Notice: Subject to any disclaimer, the term of this patent is extended or adjusted under 35 U.S.C. 154(b) by 214 days.

(21) Appl. No.: 12/703,469

(22) Filed: Feb. 10, 2010

(65) Prior Publication Data

US 2010/0205483 A1 Aug. 12, 2010

(30) Foreign Application Priority Data

Feb. 12, 2009 (JP) .................................. P2009-029848

(51) Int. Cl.
*G06F 11/00* (2006.01)
(52) U.S. Cl. ........................................... 714/26; 706/45
(58) Field of Classification Search ...................... 714/26
See application file for complete search history.

(56) References Cited

U.S. PATENT DOCUMENTS 8,065,257 B2 * 11/2011 Kuecuekyan ................... 706/46
2009/0217099 A1 * 8/2009 Kato .............................. 714/37

FOREIGN PATENT DOCUMENTS

JP 2007-293393 A 11/2007
JP 2008-293441 A 12/2008

* cited by examiner

*Primary Examiner* — Kamini Patel

(57) ABSTRACT

An operation management apparatus monitors the performance information of a system executing services and extracts correlation variants of the performance information, thus allowing the management to detect and localize performance-degrading faults of the system. It is determined whether or not the range of correlation collapse ascribed to the performance information falls within the normal range of correlation collapse measured in the normal operation of the system. A history is retained with regard to the range of correlation collapse ascribed to the performance information which does not fall within the normal range of correlation collapse. It is determined whether or not the history accumulating the predetermined number of ranges of correlation collapse approximates to the fault range of correlation collapse measured in the faulty operation of the system, thus discriminating a fault model on the basis of the performance information.

12 Claims, 10 Drawing Sheets

| Time | A.CPU | A.MEM | ... | B.CPU | ... |
|---|---|---|---|---|---|
| ... | ... | ... | ... | ... | ... |
| 2007/10/05 17:25 | 12 | 80 | ... | 33 | ... |
| 2007/10/05 17:26 | 15 | 79 | ... | 32 | ... |
| 2007/10/05 17:27 | 34 | 51 | ... | 32 | ... |
| 2007/10/05 17:28 | 63 | 51 | ... | 35 | ... |
| 2007/10/05 17:29 | 20 | 81 | ... | 50 | ... |
| 2007/10/05 17:30 | 10 | 78 | ... | 51 | ... |
| 2007/10/05 17:31 | 11 | 79 | ... | 34 | ... |
| ... | ... | ... | ... | ... | ... |
| 2007/11/07 8:30 | 20 | 79 | ... | 90 | ... |

| INPUT(X) | OUTPUT(Y) | α | β | ... | WEIGHT | ... |
|---|---|---|---|---|---|---|
| A.CPU | A.MEM | −0.6 | 100 | ... | 0.88 | ... |
| ... | ... | ... | ... | ... | ... | ... |
| C.CPU | C.MEM | −0.3 | 100 | ... | 0.63 | ... |
| B.MEM | C.MEM | 2 | −10 | ... | 0.51 | ... |
| ... | ... | ... | ... | ... | ... | ... |

201

OPERATION MANAGEMENT APPARATUS AND METHOD THEREOF

BACKGROUND OF THE INVENTION

The present application claims priority on Japanese Patent Application No. 2009-29848, the content of which is incorporated herein by reference.

FIELD OF THE INVENTION

The present invention generally relates to information processing equipment that provides information and telecommunications services such as WEB services and business services, and in particular to operation management apparatuses and methods for accurately detecting and localizing performance-degrading faults of information-telecommunications systems.

DESCRIPTION OF THE RELATED ART

Conventionally, various technologies have been developed and disclosed with respect to fault monitoring and prediction in information-telecommunications systems as follows:
Patent Document 1: Japanese Patent Application Publication No. 2007-293393
Patent Document 2: Japanese Patent Application Publication No. 2008-293441

The first conventional art is directed to an operation management apparatus that detects faults when the performance information exceeds a certain threshold which is set to each element of the performance information. This operation management apparatus sets thresholds which are values explicitly indicating the occurrence of faults and which are used to detect faults in connection with individual elements of the performance information.

The second conventional art is directed to an operation management apparatus in which two values of the performance information are arbitrarily selected and used to produce a time-series transform function using one value as an input value and the other value as an output value, thus producing a correlation model. Upon detecting new performance information, the operation management apparatus determines whether or not the new performance information belongs to the transform function of the correlation model, whereby it detects faults based on the frequency of correlation collapse and the quantity of correlation collapse.

The operation management apparatus of the first conventional art has a drawback in that lower thresholds increase the frequency of erroneous detection of faults so as to confuse the management when the performance information is greatly varied. Higher thresholds make it difficult to detect significant faults, wherein the system operation is maintained in a stable manner, but it is difficult to detect performance errors, such as degradation of response speed in communication. In addition, it is difficult to detect faults, such as bottlenecks occurring due to the erroneous relationship between input/output elements of the information performance.

The operation management apparatus of the second conventional art, which is designed to detect faults based on the frequency and quantity of correlation collapse, may hardly detect faults in the system involved in maldistributed elements of the information performance, wherein the correlation collapse frequently occurring in limited elements may be hardly detected, unless the frequency of correlation collapse increases significantly in terms of the entirety of the system.

In other words, the operation management apparatus of the second conventional art produces a correlation model in the normal operation in order to detect performance-degrading faults of the system, wherein it detects and locates faults based on the collapsed state of the correlation model, but it suffers from the following problems.

The operation management apparatus, which is designed to detect faults based on the frequency and quantity of correlation collapse, fails to detect faults frequently occurring in limited elements in the system involved in maldistributed elements of the information performance, unless the frequency of correlation collapse increases significantly in terms of the entirety of the system. Generally speaking, three-layered hierarchical systems including various constituent elements, namely WEB, AP (i.e. Application), and DB (i.e. Database), are each configured with a large number of WEB sites and a large number of applications in light of load distribution, but with a small number of databases. In this system, the operation management apparatus may disregard the correlation collapse frequently occurring in databases, the number of which is smaller than the number of WEB sites and the number of applications, because they may seldom cause significant faults critically affecting the entire system operation.

The operation management apparatus fails to detect faults in certain models each involved in networking traffic values between two nodes since no correlation collapse occurs in the traffic in the normal operation, although these models definitely incur faults due to correlation collapse occurring in the traffic.

SUMMARY OF THE INVENTION

The present invention seeks to solve one or more of the above problems, or to improve upon those problems at least in part.

The present invention is directed to an operation management apparatus or method which monitors the performance information of the system executing services and extracts correlation variants of the performance information so as to allow the management to detect and localize performance-degrading faults of the system.

In the above, the normal range of correlation collapse measured in the normal operation of the system is accumulated in the normal model range accumulation unit, while the fault range of correlation collapse measured in the faulty operation of the system is accumulated in the fault model range accumulation unit.

It is determined whether or not the range of correlation collapse ascribed to the performance information falls within the normal range of correlation collapse. The history is accumulated with regard to the range of correlation collapse ascribed to the performance information which does not fall within the normal range of correlation collapse. It is determined whether or not the history accumulating the predetermined number of ranges of correlation collapse approximates to the fault range of correlation collapse, thus discriminating a fault model on the basis of the performance information.

The above procedures can be implemented by means of programs that are stored in computer-readable digital storage media.

The present invention offers the following effects.

The performance information measured in the normal operation is modeled in terms of the correlation and is monitored in terms of the range of correlation collapse with respect to each of constituent elements of the system, such as WEB sites, applications, and databases. This allows the management to detect the forewarning of faults and to locate fault positions in the system. Thus, it is possible to accurately detect performance-degrading faults and to localize faults.

It is possible to notify the management of the fault probability when the range of correlation collapse ascribed to the performance information approximates to the fault range of correlation collapse, which is registered in advance, for a certain time period with respect to each constituent element of the system. The present invention is capable of detecting faults using a limited number of fault models.

Due to the determination as to whether or not the range of correlation collapse ascribed to the performance information falls within the normal range of correlation collapse during the operation of the system, the management is able to simply determine that the system operates normally, unless it receives the fault notification.

BRIEF DESCRIPTION OF THE DRAWINGS

The above features and advantages of the present invention will be more apparent from the following description of certain preferred embodiments taken in conjunction with the accompanying drawings.

FIG. 4 shows the details of a correlation model.

DESCRIPTION OF THE PREFERRED EMBODIMENTS

The present invention will be now described herein with reference to illustrative embodiments. Those skilled in the art will recognize that many alternative embodiments can be accomplished using the teachings of the present invention and that the invention is not limited to the embodiments illustrated for explanatory purposes.

Before specifically describing the preferred embodiments of the present invention, the basic constitution and operation of an operation management apparatus will be described with reference to FIGS. 1 to 5.

Figure 1:
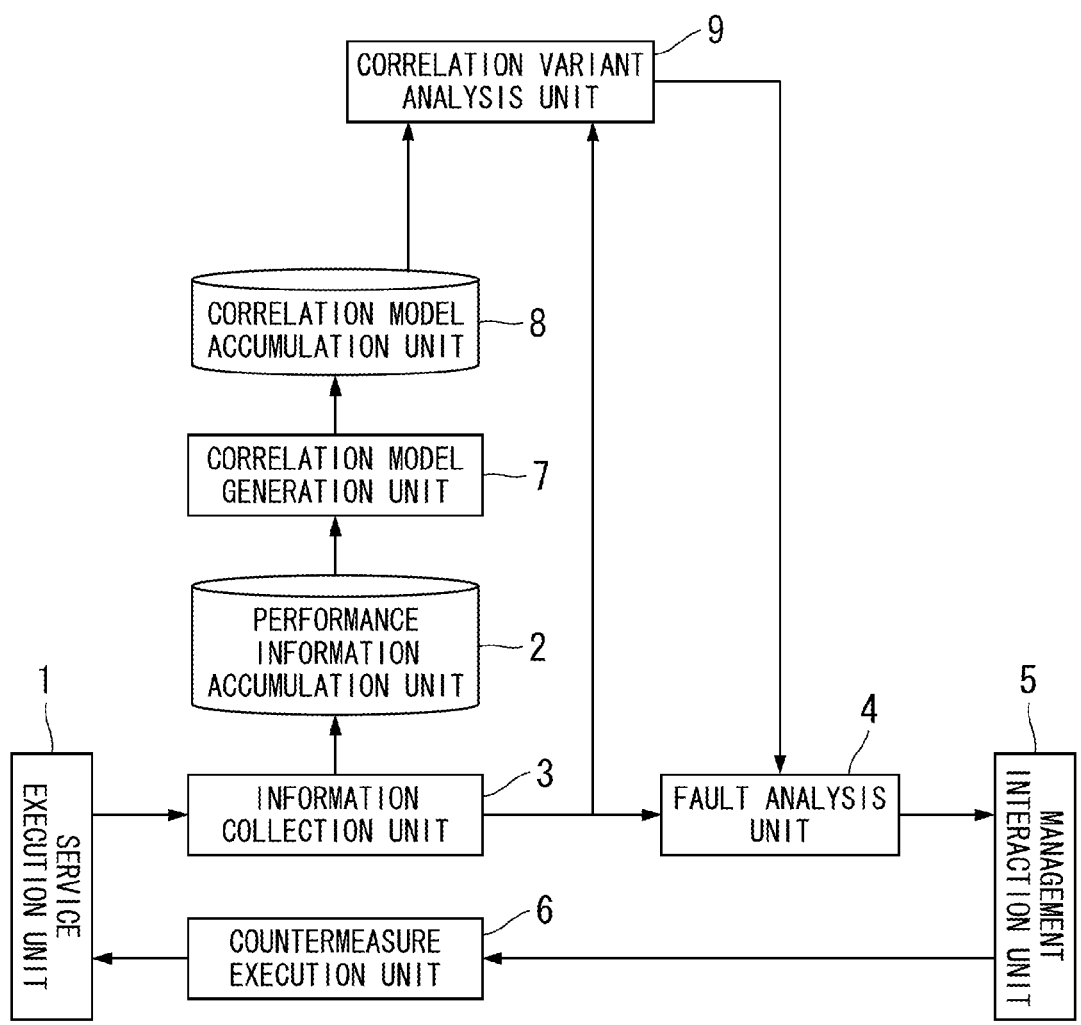
FIG. 1 is a block diagram showing the basic constitution of an operation management apparatus of the present invention.

Referring to FIG. 1, the operation management apparatus of the present invention is constituted of a service execution unit 1, a performance information accumulation unit 2, an information collection unit 3, a fault analysis unit 4, a management interaction unit 5, a countermeasure execution unit 6, a correlation model generation unit 7, a correlation model accumulation unit 8, and a correlation variance analysis unit 9.

The service execution unit 1 is equivalent to the information processing equipment presenting information-telecommunications services, such as WEB services and business services.

The performance information accumulation unit 2 accumulates various elements of the performance information handled by the service execution unit 1.

The information collection unit 3 detects and outputs the operating state including the performance information of the service execution unit 1 and error messages. The information collection unit 3 accumulates the performance information included in the operating state in the performance information accumulation unit 2.

The fault analysis unit 4 performs fault analysis based on output data of the information collection unit 3 and the correlation variant analysis unit 9.

The management interaction unit 5 presents the fault analysis result of the fault analysis unit 4. It also receives and outputs a countermeasure to the countermeasure execution unit 6.

Based on the countermeasure from the management interaction unit 5, the countermeasure execution unit 6 executes the countermeasure using the service execution unit 1.

The correlation model generation unit 7 retrieves the performance information for a certain period from the performance information accumulation unit 2 so as to produce a time-series transform function based on two arbitrary values of the performance information, thus producing a correlation model representing the entire operating state of the service execution unit 1.

The correlation model accumulation unit 8 accumulates the correlation model produced by the correlation model generation unit 7.

Upon receiving the new performance information detected by the information collection unit 3, the correlation variant analysis unit 9 determines whether or not the new performance information meets the relationship designated by each of transform functions established in correlation models (which are accumulated in the correlation model accumulation unit 8 in connection with various pieces of the performance information) within a certain error range. The analysis result of the correlation variant analysis unit 9 is supplied to the fault analysis unit 4.

Next, the basic operation of the operation management apparatus will be described with reference to FIGS. 1 to 5.

Figures 2, 3:
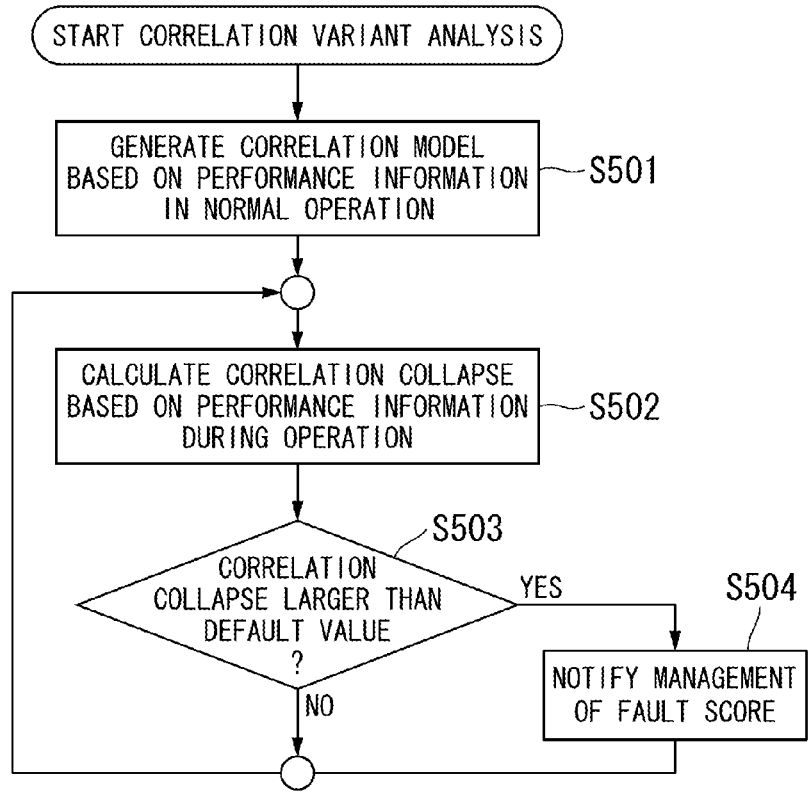
FIG. 2 shows the details of the performance information.
FIG. 3 is a flowchart showing a process for analyzing correlation variants of the performance information, thus accurately detecting faults.

First, the information collection unit 3 detects the operating state of the service execution unit 1 so as to accumulate the performance information in the performance information accumulation unit 2. When the service execution unit 1 executes WEB services, for example, the information collection unit 3 periodically detects an activity ratio of CPU or a residual storage of memory with respect to each of servers providing WEB service at specified time intervals. FIG. 2 shows an example of the performance information, i.e. performance information 101, which is detected by the information collection unit 3. Specifically, the performance information 101 includes various values in connection with "Time", "A.CPU" (representing the activity ratio of CPU in Server A), "A.MEM" (representing the residual storage of memory in Server A), and "B.CPU" (representing the activity ratio of CPU in Server B) at specific dates and times, which are sequentially changed by one minute. The value "12" is written in the column of A.CPU at the time "2007/10/5 17:25", for example. The other values "15", "34", and "63" are respectively written at times "17:26", "17:27", and "17:28" of the same day "2007/10/05".

The fault analysis unit 4 performs fault analysis in accordance with the predetermined procedures. In accordance with an instruction for presenting an alarm message to the management upon detecting a high activity ratio of CPU (which is higher than a predetermined value), the fault analysis unit 4 determines using a threshold as to whether or not a specific server bears a high load on the basis of the performance information detected by the information collection unit 3.

The management interaction unit 5 presents the analysis result of the fault analysis unit 4 to the management. When the management issues a certain instruction based on the analysis result, the management interaction unit 5 controls the service execution unit 1 via the countermeasure execution unit 6 so that the service execution unit 1 will execute a certain management command. When the management interaction unit 5 notifies the management of the status that the CPU load becomes high, for example, the management will reduce the working load or reconfigure the system to perform the load distribution. Through repeating the above procedures for collecting and analyzing the information and for performing management commands, the service execution unit 1 can continuously perform fault managements.

The operation management apparatus of FIG. 1 exploits the correlation model generation unit 7, the correlation model accumulation unit 8, and the correlation variant analysis unit 9 so as to accurately detect faults by way of the aforementioned fault analysis.

FIG. 3 shows a process for analyzing correlation variants of the performance information, thus accurately detecting faults.

(a) Step S501

The correlation model generation unit 7 produces transform functions established in connection with various pieces of the performance information 101 of FIG. 2 which are accumulated in the performance information accumulation unit 2, thus generating correlation models. The correlation model accumulation unit 8 accumulates correlation models.

FIG. 4 shows the details of a correlation model 201, which is produced in step S501 so as to present a transform function "$Y=\alpha X+\beta$" by use of an input X (e.g. A.CPU), an output Y (e.g. A.MEM), $\alpha$ and $\beta$ (e.g. $-0.6$ and 100) which are time-series values retrieved from the performance information 101 (see FIG. 2), and a weight (e.g. 0.88). Herein, the time-series value generated by the transform function is compared to the actual time-series value of the performance information so as to calculate a difference, i.e. a transform error, based on which the weight of the transform function (e.g. 0.88) is calculated. The contents of the correlation model 201 are determined in such a way that a transform function is produced based on two sets of the performance information, so as to extract a significant correlation having a certain weight between them. In this connection, the transform function is not necessarily represented by the equation "$Y=\alpha X+\beta$", which can be replaced with other expressions representing the transformation of time-series values of the performance information.

(b) Step S502

The correlation variant analysis unit 9 determines whether or not the new performance information acquired by the information collection unit 3 matches the correlation designated by the correlation model.

Upon receiving the performance information, which is listed in the bottom line of the performance information 101 of FIG. 2 at "2007/11/07 8:30", for example, the correlation variant analysis unit 9 sequentially scans transform functions described in the correlation model 201 of FIG. 4 while comparing a transform value (which is calculated using each transform function inputting the performance information) with a new value of the performance information (serving as the output of each transform function). Herein, the correlation variant analysis unit 9 determines that the correlation is maintained with respect to the performance information which falls within a certain error range of transformation, while it determines the occurrence of the correlation collapse with respect to the performance information which exceeds the error range of transformation. The above procedures are repeated on all the transform functions so as to determine whether or not correlation variants occur with respect to all sets of the performance information; then, the correlation variant analysis unit 9 produces the correlation variant information including a fault score (representing a degree of correlation variants) and a fault factor (representing a factor causing correlation variants). The correlation variant information is supplied to the fault analysis unit 4.

(c) Step S503

Upon receipt of the correlation variant information, the fault analysis unit 4 determines whether or not the fault score exceeds a default value which is determined in advance.

(d) Step S504

When the fault score exceeds the default value, the fault analysis unit 4 controls the management interaction unit 5 to notify the management of a fault probability.

Figure 5:
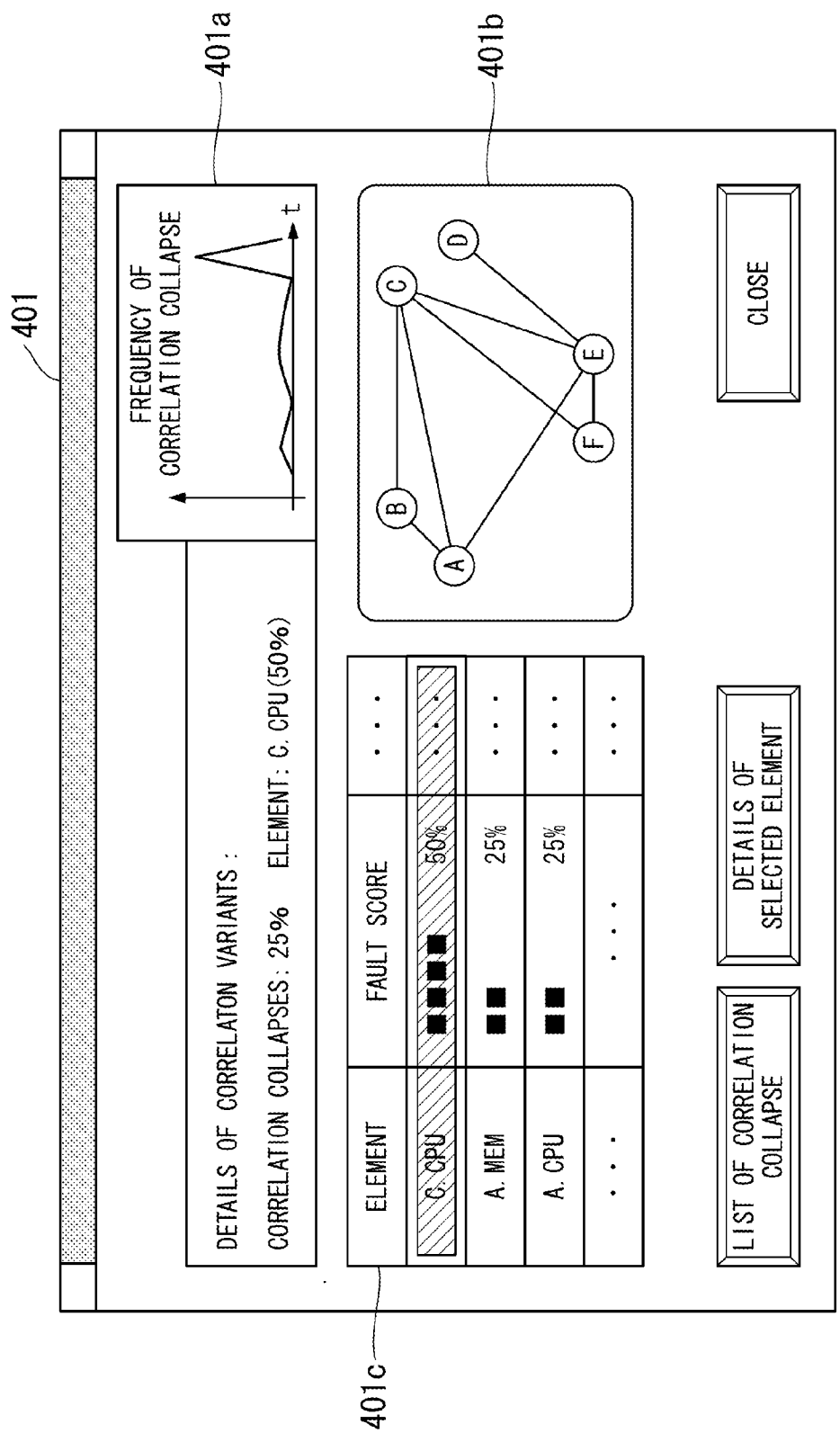
FIG. 5 shows a display image presented by the operation management apparatus shown in FIG. 1.

FIG. 5 shows a display image 401 which the management interaction unit 5 presents to the management. The display image 401 includes a first section 401*a* indicating the frequency of correlation collapse representing a fault score, a second section 401*b* indicating the correlation of fault positions, and a third section 401*c* indicating a list of elements having significant fault scores. Using the display screen 401, it is possible to notify the management of a fault probability with respect to the element "C.CPU" having the highest fault score, for example.

According to the operation management apparatus of FIG. 1, a correlation model is produced based on the performance information in the normal operation incurring no faults, and a ratio of correlation variants is calculated with respect to the new performance information compared with the correlation model of the normal operation, thus locating a fault position upon detection of the occurrence of a performance error, such as a response degradation.

The operation management apparatus of FIG. 1 is limited in function since it is designed to notify the management of a fault probability with respect to a certain element having a high frequency of correlation collapse. For this reason, the operation management apparatus of FIG. 1 may hardly present performance errors in the system involved in maldistributed applications, even when faults frequently occur in a server involved in limited applications.

For example, the operation management apparatus of FIG. 1 may suffer from the above problem when it manages WEB servers and DB servers which serve WEB services as applications. Generally speaking, the number of WEB servers is larger than the number of DB servers; hence, even when correlation collapse frequently occurs in DB servers, the frequency of correlation collapse does not significantly increase so that the operation management apparatus may fail to notify the management of a fault probability.

1. First Embodiment

An operation management apparatus according to a first embodiment of the present invention will be described with reference to FIGS. 6 to 10.

Figure 6:
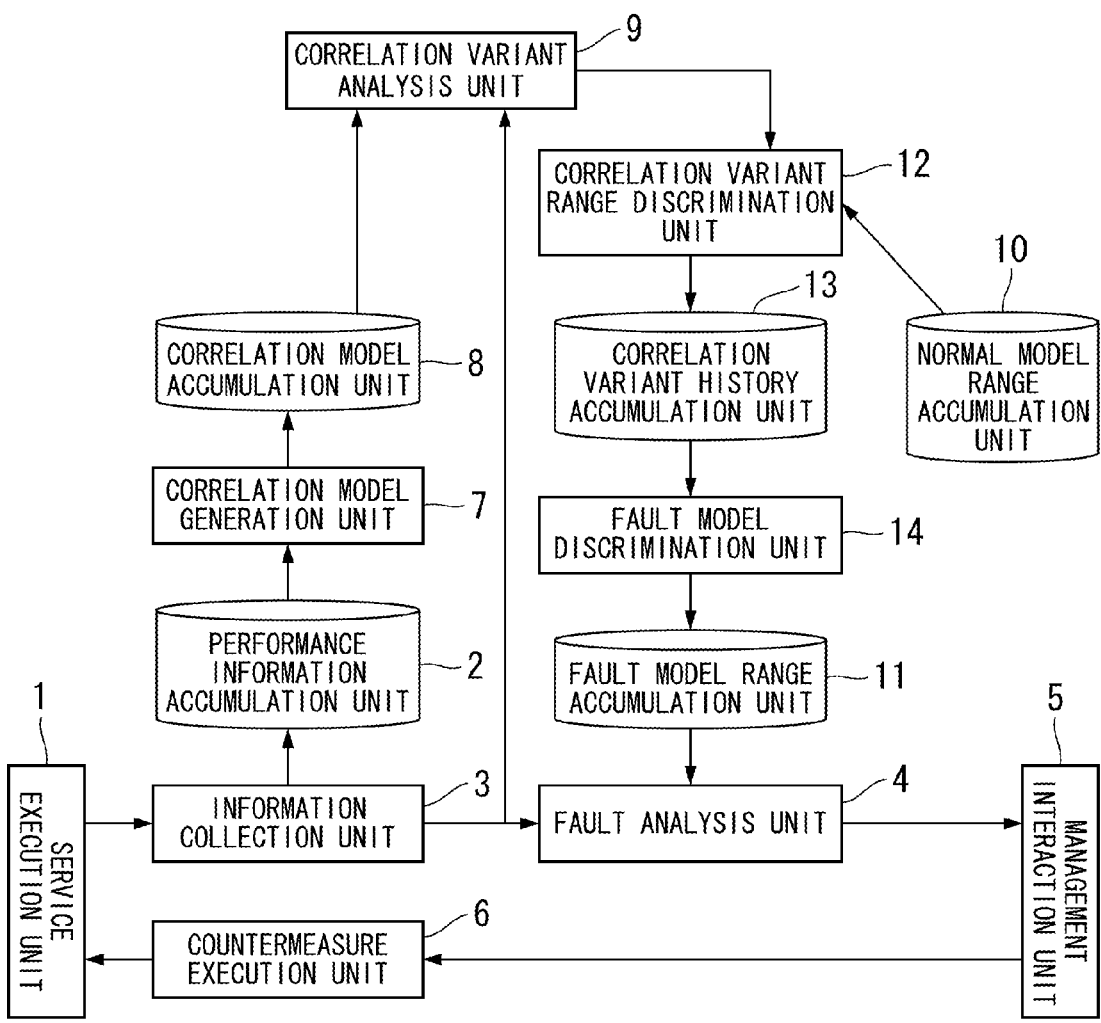
FIG. 6 is a block diagram showing the constitution of an operation management apparatus according to a first embodiment of the present invention.

FIG. 6 is a block diagram showing the constitution of the operation management apparatus of the first embodiment, which further includes a normal model range accumulation unit 10, a fault model range accumulation unit 11, a correlation variant range discrimination unit 12, a correlation variant history accumulation unit 13, and a fault model discrimination unit 14 in addition to the foregoing units 1 to 9 included in the operation management apparatus of FIG. 1.

The normal model range accumulation unit 10 accumulates ranges of correlation collapse with respect to correlation models (see a normal model range 802 shown in FIG. 9) based on the performance information of the normal operation input by the management.

The fault model range accumulation unit 11 accumulates ranges of correlation collapse with respect to correlation models based on the performance information of the faulty operation input by the management.

The correlation variant range discrimination unit 12 compares the range of correlation collapse ascribed to the performance information output from the correlation variant analysis unit 9 with the range of correlation collapse accumulated in the normal model range accumulation unit 10, thus determining whether or not the performance information falls within the normal range of correlation collapse in light of the comparison result.

The correlation variant history accumulation unit 13 accumulates the frequency of correlation collapse based on the performance information with respect to each correlation model.

With reference to the history regarding the frequency of correlation collapse accumulated in the correlation variant history accumulation unit 13, the fault model discrimination unit 14 determines whether or not the range of correlation collapse ascribed to the performance information approximates to the range of correlation collapse accumulated in the fault model range accumulation unit 11 with respect to each correlation model. When the fault model discrimination unit 14 discriminates a fault model (i.e. a correlation model having a probable fault) whose range of correlation collapse approximates to that of the performance information, it notifies the fault analysis unit 4 of the fault model together with an approximation ratio which is calculated through the comparison between the performance information and the fault model.

Upon receiving the fault model and the approximation ratio from the fault model discrimination unit 14, the fault analysis unit 4 presents them to the management via the management interaction unit 5.

Figure 7:
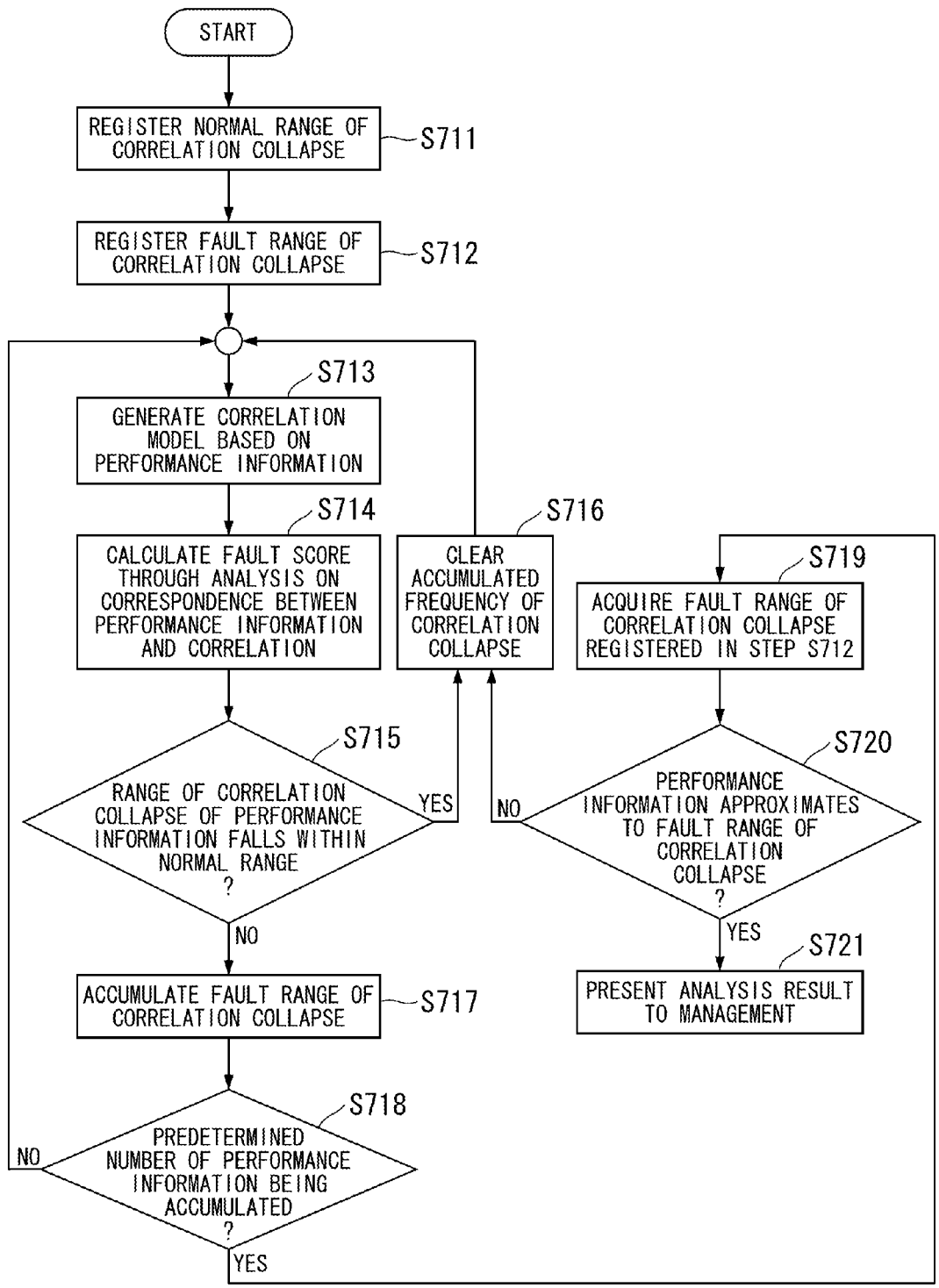
FIG. 7 is a flowchart explaining the operation of the operation management apparatus of the first embodiment shown in FIG. 6.

Next, the operation of the operation management apparatus of the first embodiment will be described with reference to FIG. 7.

(a) Step S711

The management registers the normal model range accumulation unit 10 with the normal range of correlation collapse which is determined in connection to the normal operation of the operation management apparatus. This procedure can be performed prior to the initiation of the operation management apparatus, or it can be arbitrarily performed during the operation of the operation management apparatus. Referring to a correlation model A which is established to indicate the correlation between the activity ratio of CPU of a server A (i.e. A.CPU) and the activity ratio of CPU of a server B (i.e. B.CPU) and in which the normal range of correlation collapse ranges from 5% to 10%, for example, the management registers the normal model range accumulation unit 10 with the value "5-10" as the normal range of correlation collapse regarding the correlation model A. Similarly, the management registers the normal model range accumulation unit 10 with the other values with respect to other correlation models.

(b) Step S712

The management registers the fault model range accumulation unit 11 with the fault range of correlation collapse which is determined in connection to the faulty operation of the operation management apparatus. This procedure can be performed prior to the initiation of the operation management apparatus, or it can be arbitrarily performed during the operation of the operation management apparatus.

Figure 8:
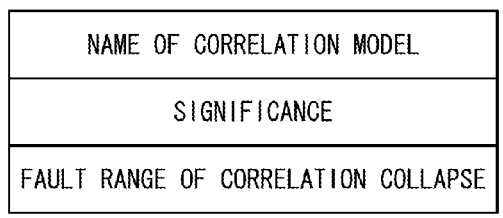
FIG. 8 shows the details of the fault model range information in the faulty operation.

FIG. 8 shows the fault model range information representing the range of correlation collapse in the faulty operation, which is constituted of "Name of Correlation Model", "Significance", and "Range of Correlation Collapse".

(c) Step S713

As described above in conjunction with the foregoing operation management apparatus shown in FIGS. 1 to 5, the correlation model generation unit 7 generates a correlation model based on the performance information which the information collection unit 3 acquires via the service execution unit 1.

(d) Step S714

The correlation variant analysis unit 9 determines whether or not the performance information (which the information collection unit 3 acquires during the operation of the operation management apparatus) matches correlation indicated by the correlation model, thus calculating a fault score based on correlation variants.

(e) Step S715

The correlation variant range discrimination unit 12 compares the range of correlation collapse ascribed to the performance information with the normal range of correlation collapse accumulated in the normal model range accumulation unit 10, thus determining whether or not the performance information falls within the normal range of correlation collapse.

(f) Step S716

When the performance information falls within the normal range of correlation collapse, the correlation variant range discrimination unit 12 clears the frequency of correlation collapse with respect to all the correlation models accumulated in the correlation variant history accumulation unit 13.

(g) Step S717

Figure 9:
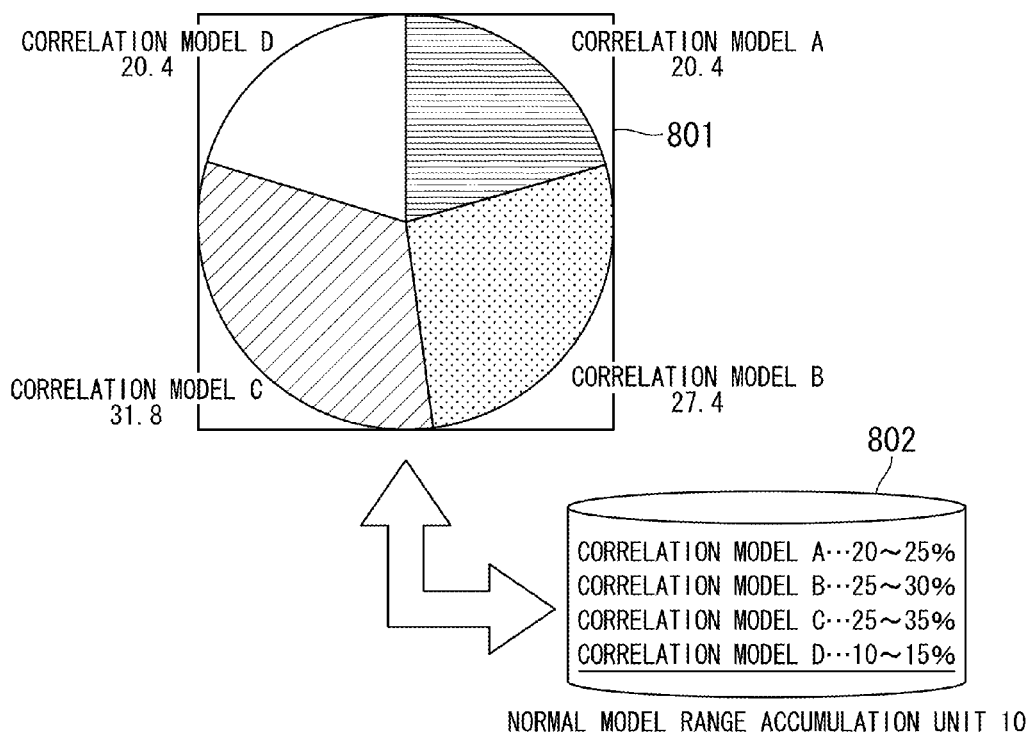
FIG. 9 shows an example of a comparison between the range of correlation collapse ascribed to the performance information and the normal range of correlation collapse with respect to various correlation models.

FIG. 9 shows the comparison between the normal range of correlation collapse and the range of correlation collapse ascribed to the performance information with respect to four correlation models A, B, C, and D. A pie graph 801 shows that the range of correlation collapse of the correlation model D is "20.4" which exceeds "10-15%" registered as the normal range of correlation collapse accumulated in a storage 802 of the normal model range accumulation unit 10. In this case, the flow proceeds to step S717 in which the correlation variant history accumulation unit 13 accumulates the frequency of correlation collapse recorded in the performance information.

(h) Step S718

Through repeating the aforementioned steps S713 to S717, the fault model discrimination unit 14 determines whether or not the correlation variant history accumulation unit 13 has accumulated the predetermined number of the performance information.

(i) Step S719

When the correlation variant history accumulation unit 13 already accumulates the predetermined number of performance information, the fault model discrimination unit 14 asks the fault model range accumulation unit 11 to acquire the fault range of correlation collapse in connection to the faulty operation of the operation management apparatus.

(j) Step S720

Based on the history regarding the frequency of correlation collapse accumulated in the correlation variant history accumulation unit 13, the fault model discrimination unit 14 determines whether or not the range of correlation collapse ascribed to the performance information approximates to the fault range of correlation collapse which is acquired in step S719.

(k) Step S721

When the fault model discrimination unit 14 discriminates a fault model whose range of correlation collapse approximates to the fault range of correlation collapse in step S720, the fault model discrimination unit 14 provides the fault analysis unit 4 with the information regarding the fault mode and its fault score, as well as the latest history regarding the frequency of correlation collapse. The fault analysis unit 4 presents the analysis result to the management via the management interaction unit 5.

Figure 10:
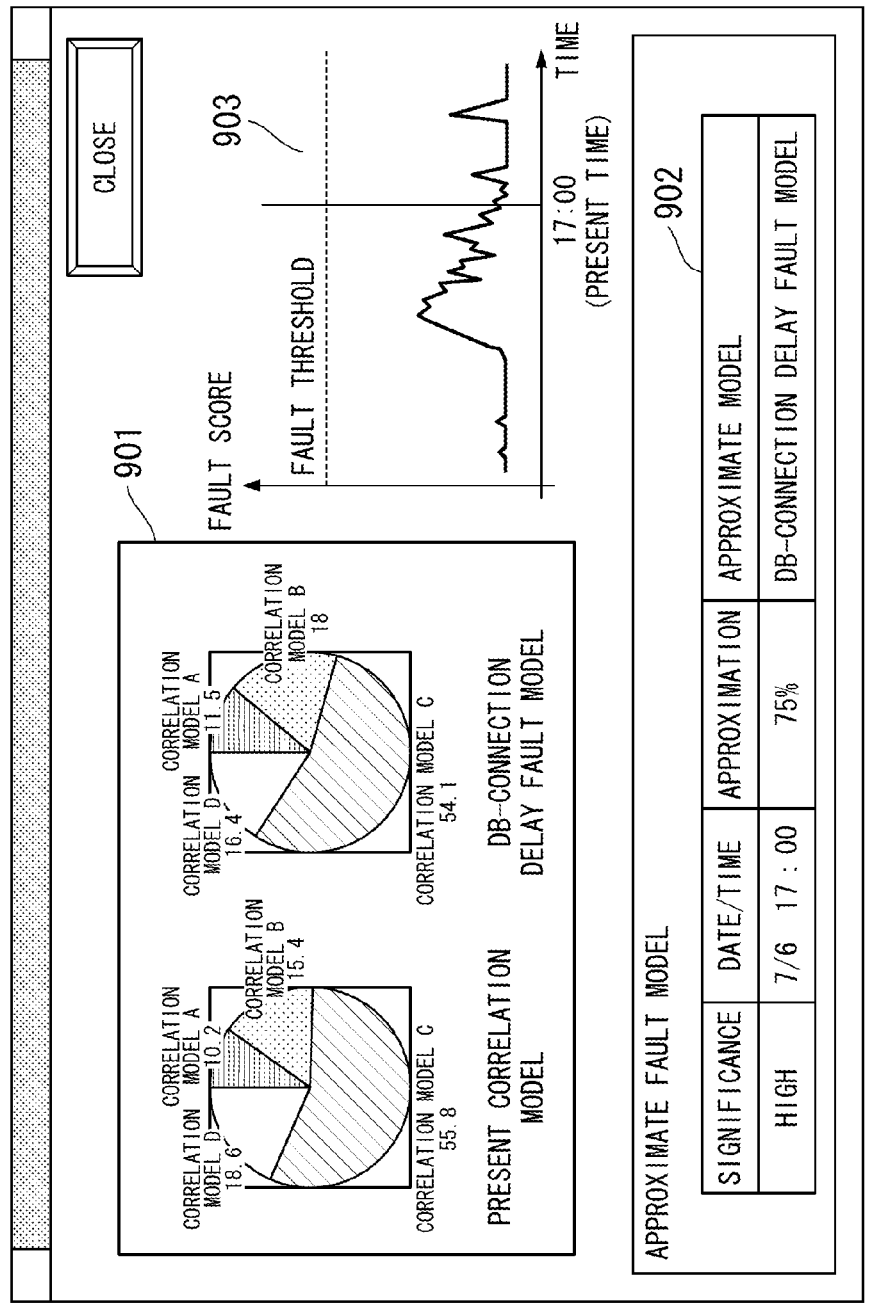
FIG. 10 shows a display image presented by the operation management apparatus of the first embodiment shown in FIG. 6.

FIG. 10 shows an example of a display image which is presented to the management. Herein, a graph 901 shows the present correlation model and the fault model (which approximates to the performance information) in terms of the range of correlation collapse. A section 902 presents the information regarding an approximation percentile with respect to the "approximate" fault model. A graph 903 presents time-series variants of a fault score.

According to time-series variants of the fault score in the graph 903, the fault score does not reach a fault threshold (which is used to discriminate the faulty operation) at the present time; hence, the operation management apparatus does not notify the management of the fault probability. This indicates a high probability in which the management does not notice the occurrence of a fault. With reference to the range of correlation collapse, however, it seems that the correlation collapse is concentrated at a certain correlation model, which is deemed approximate to "DB-Connection Delay Fault Model" which is registered in advance by the management (see the information 902). This makes it possible for the management to detect forewarning of the occurrence of a DB-connection delay fault, thus proceeding to appropriate management. For example, the management may refer to DB-logs to investigate the cause of a fault, thus determining whether or not some problem has occurred in DB-logs. Alternatively, the management may investigate negative impacts on DB-connected application servers.

The operation management apparatus of the first embodiment demonstrates the following effects.

The fault model discrimination unit 14 determines whether or not the range of correlation collapse ascribed to the performance information approximates to that of the fault model which is registered in advance, thus determining whether or not to notify the management of the fault probability. This makes it possible for the management to accurately detect faults even when the correlation collapse is concentrated at limited elements within all the elements included in services. No conventional operation management apparatus has achieved this procedure. In other words, the present embodiment is designed to overcome the foregoing problem whereby conventional apparatuses fail to detect faults when the correlation collapse is concentrated at limited elements within all the elements included in services.

The operation management apparatus of the present embodiment is capable of reliably detecting faults in certain models which are not involved in correlation collapse in the normal operation, but which definitely incur faults when the correlation collapse occurs. In other words, the present embodiment is designed to overcome the foregoing problem whereby conventional apparatuses fail to detect faults in certain models which are not involved in correlation collapse in the normal operation but which definitely incur faults when the correlation collapse occurs.

The operation management apparatus of the present embodiment is designed to determine whether or not the correlation model approximates to the fault model on the basis of the past performance; this makes it possible to easily determine probable countermeasures dealing with faults on the basis of the past experience, thus reducing the working load on the management. The present embodiment deals with only the performance information whose range of correlation collapse does not fall within the normal range of correlation collapse accumulated in the normal model range accumulation unit 10; this makes it possible to determine that the system operates normally in the non-fault period in which no fault is detected. That is, when the management investigates the cause of faults with reference to logs, it is possible to exclude logs recorded in the normal operation period from logs subjected to investigation, thus reducing the work load of the management.

2. Second Embodiment

Figure 11:
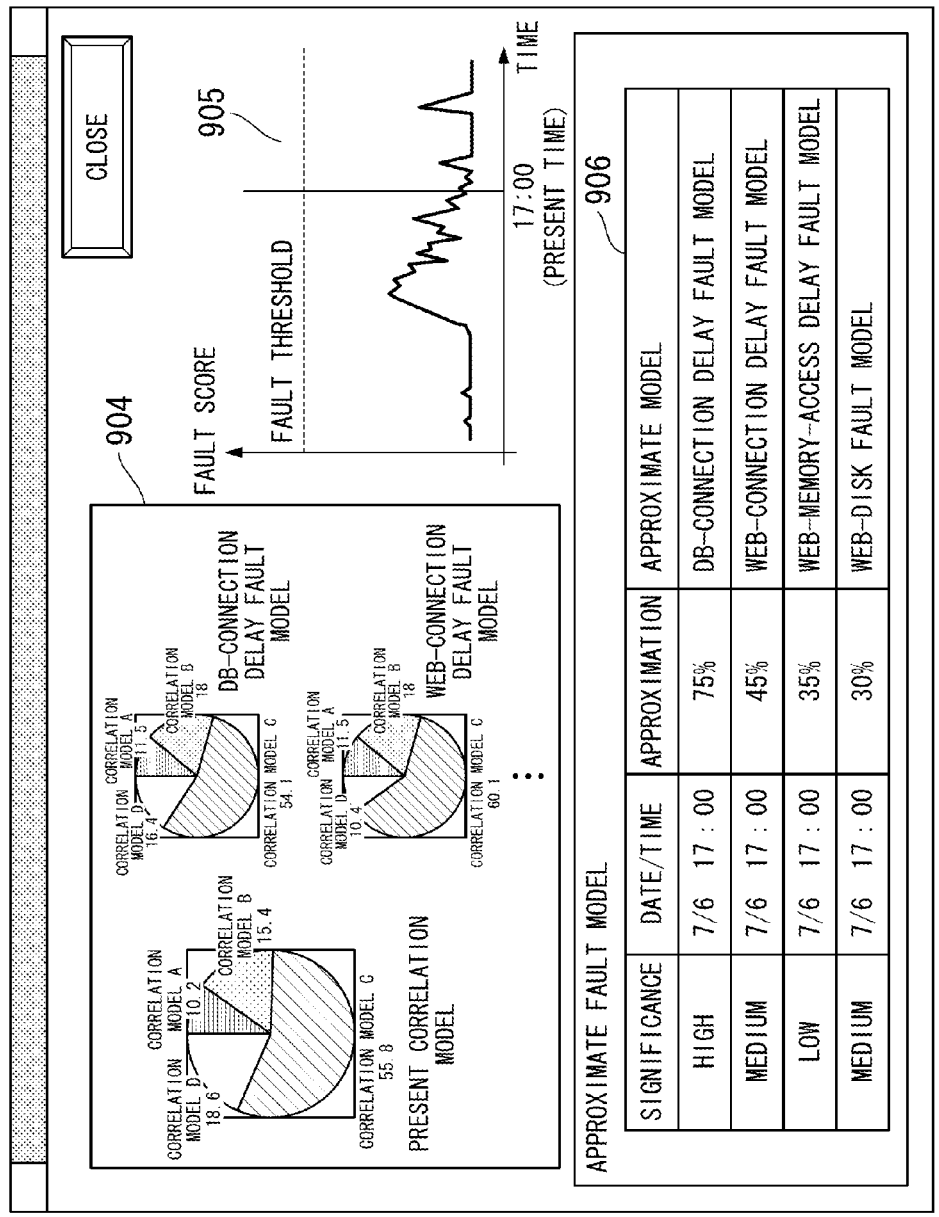
FIG. 11 shows a display image presented by an operation management apparatus of a second embodiment.

An operation management apparatus according to a third embodiment of the present invention will be described with reference to FIG. 6 and FIG. 11.

The second embodiment operates similarly to the first embodiment in terms of the accumulation of the predetermined number of performance information which does not fall within the normal range of correlation collapse. The second embodiment is characterized in that the fault model discrimination unit 14 compares the history regarding the frequency of correlation collapse accumulated in the correlation variant history accumulation unit 13 with a plurality of fault ranges of correlation collapse being acquired from the fault model range accumulation unit 11, thus determining whether or not the performance information approximates to each fault model.

Next, the effect of the second embodiment will be described with reference to FIG. 11, which shows an example of a display image that presents the management with approximation percentiles of fault models in association with the fault model discrimination unit 14. A section 906 of the display image of FIG. 11 indicates the information regarding approximation percentiles compared with the performance information with respect to various fault models. This allows the management to estimate fault probabilities in light of combinations of fault models. Specifically, the information 906 indicates the highest approximation percentile with respect to a DB-related fault model, which is followed by three WEB-related fault models having relatively high approximation percentiles. Through viewing the display image of FIG. 11, the management is able to consider the fault probability of the WEB-related fault model in addition to the fault probability of the DB-related fault model.

3. Third Embodiment

An operation management apparatus according to a third embodiment of the present invention will be described with reference to FIG. 12.

Figure 12:
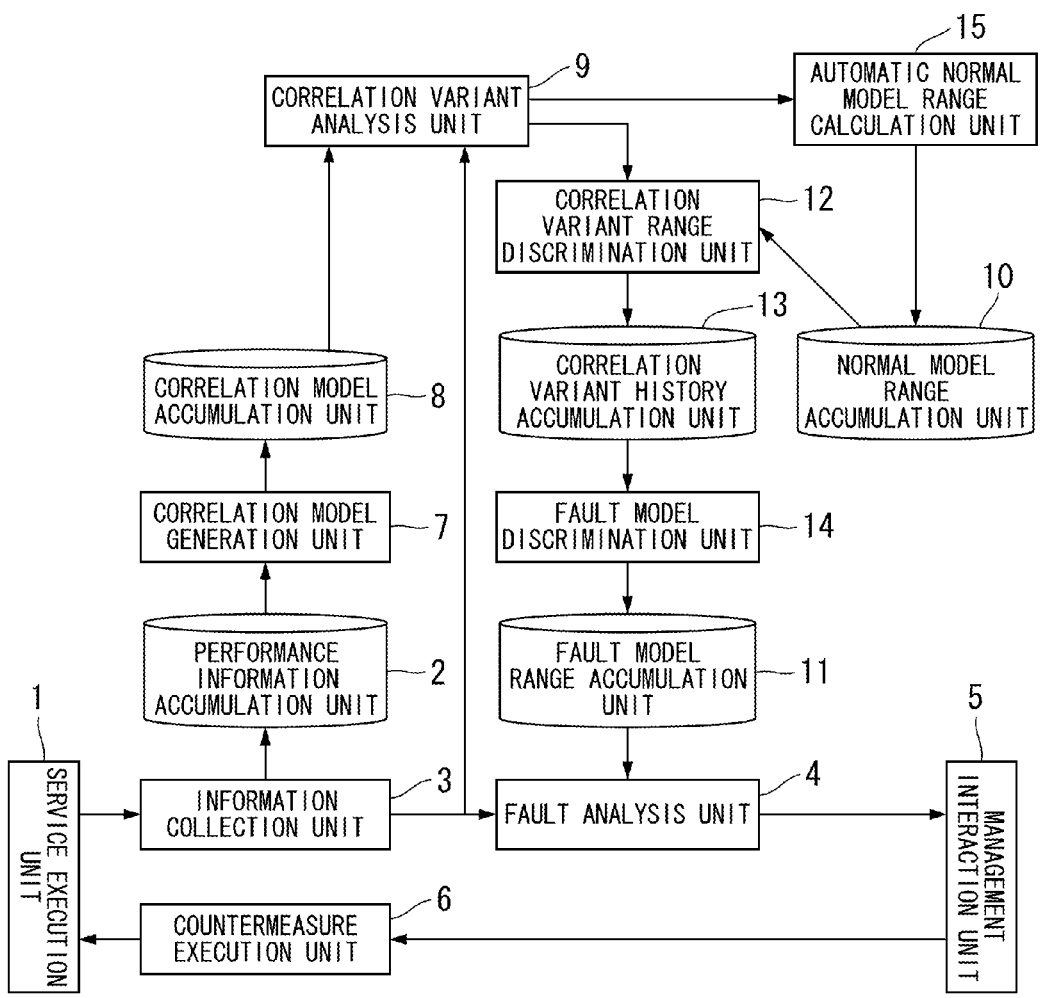
FIG. 12 is a block diagram showing the constitution of an operation management apparatus according to a third embodiment of the present invention.

The operation management apparatus of the third embodiment shown in FIG. 12 further includes an automatic normal model range calculation unit 15 in addition to the foregoing units 1 to 14 included in the operation management apparatus of the first embodiment shown in FIG. 6.

When it is determined that all the performance information analyzed by the correlation variant analysis unit 9 matches the normal range of correlation collapse within a certain error range, the automatic normal model range calculation unit 15 calculates a ratio of the range of correlation collapse with respect to each correlation model based on the correlation variant information. By repeating the above procedure, the automatic normal model range calculation unit 15 calculates the maximum value and the minimum value within the calculated ratios, thus calculating the normal range of correlation collapse. The automatic normal model range calculation unit 15 registers the calculated normal range of correlation collapse with the normal model range accumulation unit 10.

Since the third embodiment is designed such that the normal range of correlation collapse is automatically calculated and accumulated in the normal model range accumulation unit 10, the management does not need the foregoing step S711 (see FIG. 7) in which the management needs to calculate and register the normal range of correlation collapse by itself. Without such a time-consuming procedure, the third embodiment allows the management to detect faults on the basis of the normal range of correlation collapse.

It is possible to implement the aforementioned procedures of the operation management apparatus by way of programs, which can be stored in computer-readable digital storage media. These programs are installed in computers so as to perform the aforementioned procedures of the operation management apparatus. In this connection, computer-readable digital storage media refer to magnetic disks, magneto-optical disks, CD-ROM, DVD-ROM, and semiconductor memories, for example. Alternatively, programs can be distributed to computers via communication lines and executed by computers.

Lastly, it is apparent that the present invention is not limited to the above embodiments, but may be modified and changed without departing from the scope and spirit of the invention.

What is claimed is:

1. An operation management apparatus, implemented using a processor and a memory, which monitors performance information of a system executing a service and extracts correlation variants of the performance information so as to allow a management to detect and localize a performance-degrading fault of the system, said operation management apparatus comprising:
   a normal model range accumulation unit, implemented using the memory, that accumulates a normal range of correlation collapse measured in a normal operation of the system;
   a fault model range accumulation unit, implemented using the memory, that accumulates a fault range of correlation collapse measured in a faulty operation of the system;
   a correlation variant range discrimination unit, implemented using the processor, that determines whether or not a range of correlation collapse ascribed to the performance information falls within the normal range of correlation collapse;
   a correlation variant history accumulation unit, implemented using the memory, that accumulates a history regarding the range of correlation collapse ascribed to the performance information which does not fall within the normal range of correlation collapse; and
   a fault model discrimination unit, implemented using the processor, that determines whether or not the history accumulating a predetermined number of ranges of correlation collapse approximates to the fault range of correlation collapse, thus discriminating a fault model on the basis of the performance information.

2. The operation management apparatus according to claim 1 further comprising a management interaction unit, implemented using the processor, that informs a management of a latest range of correlation collapse retained in the history, which is determined to approximate to the fault range of correlation collapse, and the fault range of correlation collapse used in the fault model discrimination unit.

3. The operation management apparatus according to claim 1 further comprising a management interaction unit, implemented using the processor, that informs a management of a latest range of correlation collapse included in the history, which is determined to approximate to the fault range of correlation collapse, the fault range of correlation collapse used in the fault model discrimination unit, and an approximate percentile by which the latest range of correlation collapse retained in the history approximates to the fault range of correlation collapse.

4. The operation management apparatus according to claim 1 further comprising:
   a correlation variant analysis unit, implemented using the processor, that determines whether or not the range of correlation collapse ascribed to the performance information falls within a certain error range regarding a prescribed correlation model; and
   an automatic normal model range calculation unit, implemented using the processor, which acquires correlation variant information indicating a fault score representing an error of correlation and an element of the performance information whose range of correlation collapse falls within the certain error range, which calculates a ratio regarding the range of correlation collapse with respect to each correlation model, and which calculates a maximum value and a minimum value of the calculated ratio so as to calculate the normal range of correlation collapse, which is then accumulated in the normal model range accumulation unit.

5. An operation management method which monitors performance information of a system executing a service and extracts correlation variants of the performance information so as to allow a management to detect and localize a performance-degrading fault of the system, said operation management method comprising:
   accumulating a normal range of correlation collapse measured in a normal operation of the system;
   accumulating a fault range of correlation collapse measured in a faulty operation of the system;
   determining whether or not a range of correlation collapse ascribed to the performance information falls within the normal range of correlation collapse;
   accumulating a history regarding the range of correlation collapse ascribed to the performance information which does not fall within the normal range of correlation collapse; and determining whether or not the history accumulating a predetermined number of ranges of correlation collapse approximates to the fault range of correlation collapse, thus discriminating a fault model on the basis of the performance information.

6. The operation management method according to claim 5 further comprising:
    informing a management of a latest range of correlation collapse retained in the history, which is determined to approximate to the fault range of correlation collapse, and the fault range of correlation collapse.

7. The operation management method according to claim 5 further comprising:
    informing a management of a latest range of correlation collapse included in the history, which is determined to approximate to the fault range of correlation collapse, the fault range of correlation collapse, and an approximate percentile by which the latest range of correlation collapse retained in the history approximates to the fault range of correlation collapse.

8. The operation management method according to claim 5 further comprising:
    determining whether or not the range of correlation collapse ascribed to the performance information falls within a certain error range regarding a prescribed correlation model;
    acquiring correlation variant information indicating a fault score representing an error of correlation and an element of the performance information whose range of correlation collapse falls within the certain error range;
    calculating a ratio regarding the range of correlation collapse with respect to each correlation model; and
    calculating a maximum value and a minimum value of the calculated ratio so as to calculate the normal range of correlation collapse.

9. A non-transitory computer-readable data storage medium storing a program causing a computer to implement an operation management method which monitors performance information of a system executing a service and extracts correlation variants of the performance information, and which allows a management to detect and localize a performance-degrading fault of the system, said operation management method comprising:
    accumulating a normal range of correlation collapse measured in a normal operation of the system;
    accumulating a fault range of correlation collapse measured in a faulty operation of the system;
    determining whether or not a range of correlation collapse ascribed to the performance information falls within the normal range of correlation collapse;
    accumulating a history regarding the range of correlation collapse ascribed to the performance information which does not fall within the normal range of correlation collapse; and
    determining whether or not the history accumulating a predetermined number of ranges of correlation collapse approximates to the fault range of correlation collapse, thus discriminating a fault model on the basis of the performance information.

10. The non-transitory computer-readable data storage medium storing the program causing a computer to implement an operation management method according to claim 9 further comprising:
    informing a management of a latest range of correlation collapse retained in the history, which is determined to approximate to the fault range of correlation collapse, and the fault range of correlation collapse.

11. The non-transitory computer-readable data storage medium storing the program causing a computer to implement an operation management method according to claim 9 further comprising:
    informing a management of a latest range of correlation collapse included in the history, which is determined to approximate to the fault range of correlation collapse, the fault range of correlation collapse, and an approximate percentile by which the latest range of correlation collapse retained in the history approximates to the fault range of correlation collapse.

12. The non-transitory computer-readable data storage medium storing the program causing a computer to implement an operation management method according to claim 9 further comprising:
    determining whether or not the range of correlation collapse ascribed to the performance information falls within a certain error range regarding a prescribed correlation model;
    acquiring correlation variant information indicating a fault score representing an error of correlation and an element of the performance information whose range of correlation collapse falls within the certain error range;
    calculating a ratio regarding the range of correlation collapse with respect to each correlation model; and
    calculating a maximum value and a minimum value of the calculated ratio so as to calculate the normal range of correlation collapse.

* * * * *